(12) United States Patent
Joyce et al.

(10) Patent No.: US 9,073,579 B1
(45) Date of Patent: Jul. 7, 2015

(54) VEHICLE ROOF FOR WATER MANAGEMENT

(71) Applicant: Ford Global Technologies, LLC, Dearborn, MI (US)

(72) Inventors: John Joyce, Ypsilanti, MI (US); Jason Scott Balzer, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/454,806

(22) Filed: Aug. 8, 2014

(51) Int. Cl.
*B62D 25/07* (2006.01)
*B62D 29/00* (2006.01)

(52) U.S. Cl.
CPC .............. *B62D 25/07* (2013.01); *B62D 29/008* (2013.01)

(58) Field of Classification Search
CPC ....................................................... B62D 25/07
USPC .................................................. 296/213, 102
See application file for complete search history.

(56) References Cited

U.S. PATENT DOCUMENTS

| | | | | |
|---|---|---|---|---|
| 885,438 | A * | 4/1908 | Coffman | 296/102 |
| 3,712,664 | A * | 1/1973 | May | 296/102 |
| 3,995,891 | A * | 12/1976 | Hoyt | 296/102 |
| D262,533 | S | 1/1982 | Hanson | |
| 4,433,868 | A * | 2/1984 | Hochwitz et al. | 296/79 |
| 4,772,064 | A * | 9/1988 | Moore | 296/102 |
| D319,203 | S | 8/1991 | Tisten et al. | |
| D381,953 | S | 8/1997 | Collins et al. | |
| 5,961,175 | A * | 10/1999 | Clardy, Jr. | 296/102 |
| 6,464,291 | B2 | 10/2002 | Hynds et al. | |
| 7,585,010 | B2 | 9/2009 | Hardy et al. | |
| D678,173 | S | 3/2013 | Mcintire | |
| D690,256 | S | 9/2013 | Ewringmann | |
| 8,622,457 | B1 * | 1/2014 | McIntire | 296/102 |
| 2009/0108636 | A1 * | 4/2009 | Hanson et al. | 296/213 |

FOREIGN PATENT DOCUMENTS

JP 05139353 A * 6/1993
JP 2006027571 A * 2/2006

* cited by examiner

*Primary Examiner* — Hilary Gutman
(74) *Attorney, Agent, or Firm* — Jason Rogers; Brooks Kushman P.C.

(57) ABSTRACT

A vehicle roof panel for channeling fluid includes a raised formation at a centerline of the vehicle, and a plurality of primary troughs disposed laterally on either side of the raised formation. Each of the primary troughs defines a base surface that is recessed below a global runoff curvature of the roof. The roof panel also includes a secondary trough positioned laterally outboard of the primary troughs that defines a base surface that is substantially aligned with the global runoff curvature.

18 Claims, 2 Drawing Sheets

VEHICLE ROOF FOR WATER MANAGEMENT

TECHNICAL FIELD

The present disclosure relates to a vehicle roof structure configured to direct fluid in a longitudinal direction.

BACKGROUND

Water collecting on a vehicle roof panel should be diverted away from the door openings where it can splash onto a vehicle passenger. Also, the vehicle roof must meet several vehicle level attributes and requirements. Aesthetic styling, overall vehicle height, modal frequency requirements, strength requirements, as well as sealing, each impart unique constraints on the design of a vehicle roof structure.

SUMMARY

In at least one embodiment, a vehicle roof panel for channeling fluid includes a raised formation at a centerline of the vehicle, and a plurality of primary troughs disposed laterally on either side of the raised formation. Each of the primary troughs defines a base surface that is recessed below a global runoff curvature of the roof. The roof panel also includes a secondary trough positioned laterally outboard of the primary troughs that defines a base surface that is substantially aligned with the global runoff curvature.

The outermost of the primary troughs may be capable of diverting a higher volume of liquid flow relative to others of the plurality of primary troughs.

In at least one embodiment, a vehicle body includes body side structures, each extending longitudinally along an opposing side of the vehicle. The vehicle also includes an arched roof panel attached to each of the body side structures defining a convex global runoff curvature spanning across the vehicle and having an apex at a center region. The roof panel also defines raised formations adjacent the body side structures that are offset above the global runoff curvature. At least a pair of troughs is formed adjacent to the center region, where the troughs are offset below the global runoff curvature.

In at least one embodiment, a vehicle roof panel includes a first raised formation at a centerline of the vehicle having a riser surface partially defining a global runoff curvature extending laterally outboard towards an outboard water ditch above a door opening. The roof panel also includes first trough formations extending laterally on either side of the first raised formation, each having a first base surface recessed below the global runoff curvature. Second raised formations extend laterally outboard from each first trough formation, where each has a second riser surface substantially aligned with the global runoff curvature. The roof panel includes second trough formations that extend laterally outboard from each second raised formation. Each of the second trough formations has a second base surface recessed below the global runoff curvature. The roof panel further includes third raised formations that extend laterally outboard from each second trough formation, each having a third riser surface that is offset above the global runoff curvature. Third trough formations extend laterally outboard from the third raised formations, each having a third base surface that is substantially aligned with the global runoff curvature. The roof panel further includes fourth raised formations extending laterally outboard from each third trough formation, having a fourth riser surface that is offset above the global runoff curvature.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
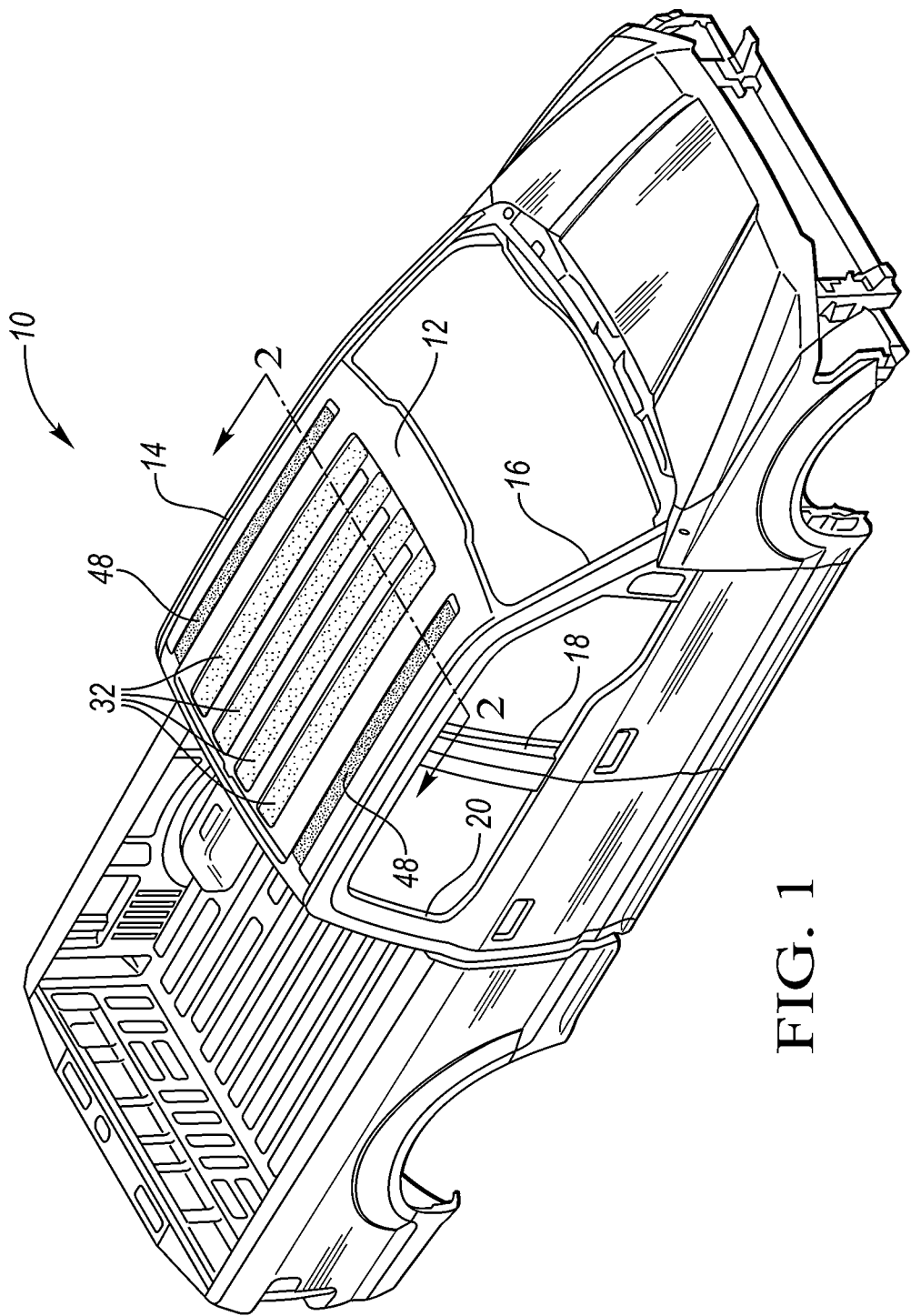
FIG. 1 is an elevation view of a vehicle body structure.

Referring to FIG. 1, a vehicle body structure 10 is shown. The body structure 10 is assembled from a plurality of components. A roof panel 12 is generally horizontal and spans over the upper portion of the body structure 10. The roof panel 12 is supported from beneath by a body side structure 14 along each opposing lateral edge of the roof panel 12. The body side structure 14 also includes a plurality of generally upright pillars to support the top portion near the roof panel 12. In the example of FIG. 1, each of a forward A-pillar 16, a mid-cabin B-pillar 18, and a rearward C-pillar 20 are included as part of the body side structure 14 to support the roof panel 12. While three pillars are depicted by way of example, a vehicle body structure may include more or less pillar according to structural and aesthetic requirements. In further embodiments, the body structure includes only forward and rearward pillars with no mid-cabin pillar. In additional further embodiments such as a sport utility vehicle (SUV), a larger passenger cabin may comprise a body structure including four vertical pillars on each side supporting the roof panel.

A number of the panel components of the body structure 10 are stamped from a sheet metal material. For example, the panels may be formed from a steel alloy sheet material, or an aluminum alloy sheet material. More specifically, component panels of the body structure 10 may be formed from a 6xxx series aluminum alloy.

The roof panel 12 is formed to include a global curvature to increase structural stiffness. The curvature is generally arched, or downwardly convex, to resist vertical loads. The roof panel also defines an apex near a centerline 22 of the vehicle. The shape of the roof panel 12 is configured to be symmetric about the centerline 22. The curvature helps to enhance dimensional accuracy of the stamping. The curvature of the roof also improves resilience of the panel and resistance to damage during handling prior to being assembled to the vehicle. In at least one embodiment a global runoff curvature of the roof panel may have a radius of curvature from about 3300 mm to 5000 mm.

Customers frequently operate the vehicle in inclement weather with liquid precipitation. It is desirable to channel water diverted off of the windshield from the front to rear along the roof while driving and minimize the fluid that flows laterally over the side edges of the roof. In this way, a customer may have passenger side window partially open for ventilation without excessive water runoff from the roof entering the passenger cabin. Similarly, a vehicle parked in a rainy environment may accumulate a volume of standing water upon the roof panel. The quantity and dimensions of formations included in the roof panel may be influenced by the degree of global curvature, as well as the overall size of the roof panel. That is, a higher number or more aggressive formations may be required to divert fluid as global curvature is increased or as the roof panel is enlarged.

Figure 2:
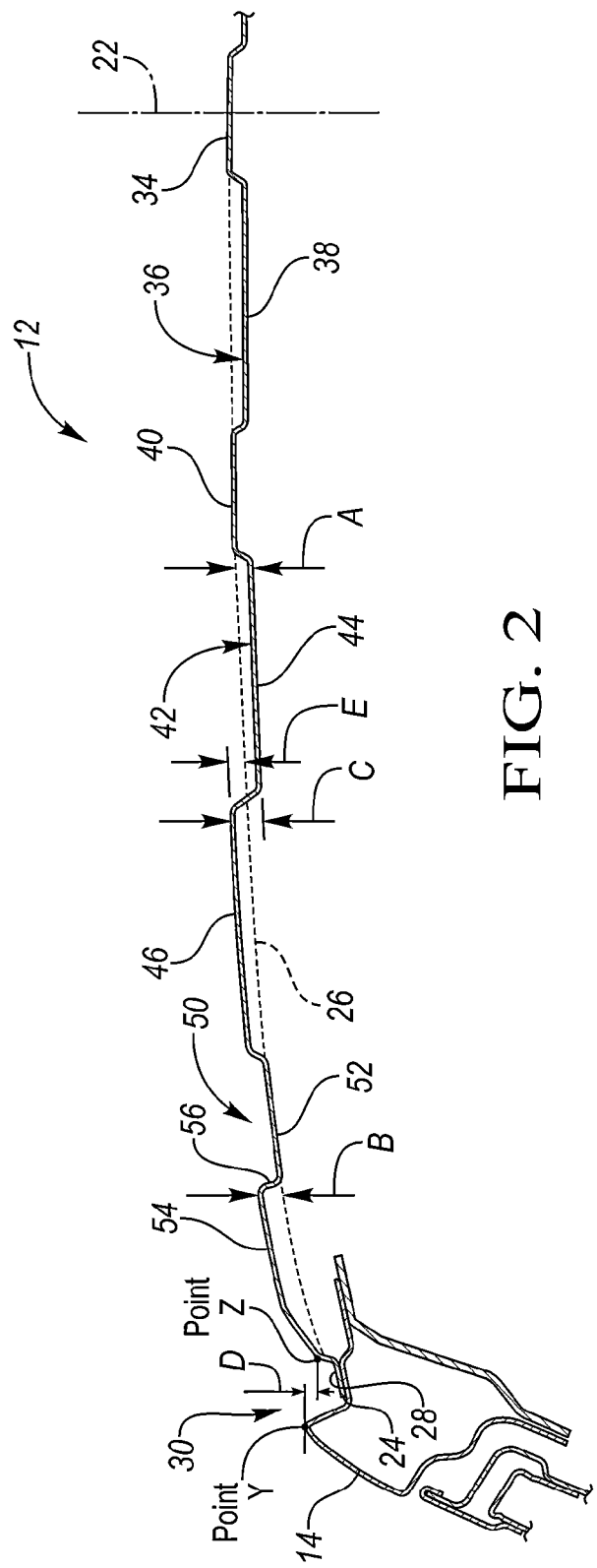
FIG. 2 is a cross sectional front view along line 2-2 of FIG. 1.

Referring to FIGS. 1 and 2, the global curvature of the roof is generally continuous and defines a peak height at the centerline 22 of the vehicle. In at least one embodiment the roof panel 12 includes a vertical height differential of about 52 mm between the centerline 22 and an outboard lateral edge 24. The difference in height related to the front view global curvature generally may urge water to drain laterally off the side of the vehicle. Specifically referring to FIG. 2, the curvature is depicted as a global runoff curvature 26.

Along each of outboard lateral edge 24 of the roof panel 12 there is a downward step and a mating flange 28 for joining the roof panel to each body side structure 14. The body side structure 14 also includes an elevated portion outboard of the mating flange 28 to form an outboard water ditch 30 above the vehicle door openings. The ditch 30 diverts water from front to rear, but has a limited volume capacity with respect to how much liquid can be diverted without lateral spillage over the side of the vehicle. An arrangement of a plurality of troughs formed in the roof panel serves to further restrict the lateral flow of liquid over the side of the roof.

It may be desirable to arrange the outboard water ditch 30 where the body side structure 14 includes an apex Point "Y" that is vertically higher that the transition into the ditch 30 denoted by Point "Z." Related to the degree of curvature of the example embodiment, Point "Y" may be positioned about 4 mm vertically higher than Point "Z." Arranging the outer side of the ditch to be vertically higher can help to optimize the amount fluid diverted by the outboard water ditch 30.

Each of the troughs defines a base surface and side walls extending upwardly therefrom. Several of troughs include a base surface disposed at differing heights relative to the global runoff curvature. The range of differing offsets may allow the roof to manage a larger volume of fluid without lateral runoff over the side edge of the roof.

A series of primary troughs 32 is disposed about a vehicle center line, and each extends longitudinally along the roof panel 12. The primary troughs 32 are depressed downwardly from the global runoff curvature 26. Dimension "A" reflects the relative offset between the base surface of a primary trough 32 and the global runoff curvature 26.

Referring to FIG. 2, four primary troughs are formed near a center portion of the roof panel 12. A first raised formation 34 is arranged at the centerline 22 of the vehicle, and is in substantially aligned with the global runoff curvature 26. A first trough formation 36 extends laterally outboard from either side of the first raised formation. The first trough formations 36 include a first base surface 38 that is recessed below the global runoff curvature 26. A second raised formation 40 extends laterally outboard from each of the first trough formations 36. Similarly, a second trough formation 42 extends laterally outboard from each of the second raised formations 40. A base surface 44 of the second trough formation 42 is recessed below the global runoff curvature 26. In at least one embodiment, each of the first trough formations and the second trough formations include a base surface that is downwardly offset about 7 mm from the global runoff curvature.

The roof panel 12 also includes raised formations at an outboard portion along either side of the roof panel. Dimension "B" reflects the relative offset between the raised formation and the global runoff curvature 26. Since the raised formations are at an outboard region of the roof panel, the height from ground of the global runoff curvature 26 is generally less than areas near the center portion of the roof panel 12. Therefore, upward formations may be utilized at the outboard portions that remain below a vehicle maximum height. For example, the raised formation may be upwardly offset about 6 mm from the global runoff curvature.

A vertical transition from the outermost primary trough to an adjacent raised formation above the global runoff curvature may yield a larger vertical transition between the two regions. A third raised formation 46 extends laterally outboard from each of the second trough formations 42. The third raised formations 46 have a riser surface that offset above the global runoff curvature 26. Dimension "C" reflects the offset between the third raised formation 46 and base surface 44 of the most outboard primary trough. The combination of the downward transition of the primary troughs adjacent to the upward transition of the third raised formation 46 provides a vertical step height of about 14 mm between the center region and the outboard regions of the roof panel 12. The increased vertical step height restricts a greater volume of liquid from flowing laterally out of the center portion of the roof to effectively channel liquid away from the door openings.

The outboard regions of the roof may also include secondary troughs 48. Since the third raised formations 46 are upwardly offset from the global runoff curvature 26, the secondary troughs 48 may be formed having a base surface that is substantially aligned with the global runoff curvature 26. A third trough formation 50 extends laterally outboard from each of the third raised formations 46, and includes a third base surface 52 that is aligned with the global runoff curvature 26. A fourth raised formation 54 extends laterally outboard from each third trough formation 50, and provides a transition to the mating flange 28.

Similar to the other trough formations, the third trough formations include a pair of upward transition walls extending from either side of the third base surface 52. In at least one embodiment, the secondary trough is positioned such that an outboard wall 56 of the third trough formations 50 is located no more than 100 mm inwardly spaced from the outboard water ditch 30.

The collection of the several longitudinal troughs having differing vertical heights helps reduce the effect of the front view global runoff curvature 26 on lateral fluid flow. Each trough resists a corresponding volume of fluid from laterally traversing each vertical transition. The troughs collectively channel fluid rearward as opposed to laterally over the side of the vehicle. The combination of the troughs is capable of diverting a cumulative amount of fluid to prevent an excessive amount of liquid spillover down the side of the vehicle. In the example provided, the sum of the vertical dimensions of the third through 50 and the second trough 42 is must meet a certain depth to divert a desired amount of fluid. In at least one embodiment, the sum of Dimension "B" plus Dimension "E" is at least 10 mm. As discussed above, the target value for a sum of trough dimensions may be influenced by the degree of global curvature, as well as the size of the roof panel.

A further advantage of aspects of the present disclosure is achieving increased depth troughs without increasing overall vehicle height. Vehicles such as pickup trucks or large SUV's may have a taller ride height compared to passenger cars. The increased height causes a larger frontal view area, which in turn may affect fuel economy. The increased overall vehicle height must also be limited in order to fit the vehicle into a residential garage. The arched shape of the roof panel causes the maximum height to be at about the center line of the vehicle. By downwardly recessing the primary troughs near the centerline of the vehicle, the overall height of the vehicle can be reduced as compared to upwardly protruding formations near the max height. In at least one embodiment, an outboard raised formation defines a peak having a height from ground approximately equal to the maximum vehicle height at the centerline of the vehicle.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle roof panel for channeling fluid comprising:
a raised formation at a centerline of the vehicle;
a plurality of primary troughs disposed laterally on either side of the raised formation, each primary trough defining a base surface that is recessed below a global runoff curvature; and
a secondary trough laterally outboard of the primary troughs defining a base surface that is substantially aligned with the global runoff curvature.

2. The vehicle roof panel of claim 1 further comprising an outboard raised formation on either side of the secondary trough wherein the raised formation is upwardly offset at least 14 mm from the base surface of the primary troughs.

3. The vehicle roof panel of claim 2 wherein the outboard raised formation has a peak height from ground that is approximately equal to a maximum vehicle height.

4. The vehicle roof panel of claim 1 further defining a ditch extending longitudinally along a lateral edge of the roof panel wherein an outboard wall of the secondary trough is inwardly spaced no more than 100 mm from the ditch.

5. The vehicle of claim 1 wherein outermost primary troughs are capable of channeling a higher volume of liquid flow relative to others of the plurality of primary troughs.

6. The vehicle roof panel of claim 1 wherein the roof panel is formed from an aluminum alloy sheet material.

7. A vehicle roof panel comprising:
a first raised formation at a centerline of the vehicle having a riser surface partially defining a global runoff curvature extending laterally outboard towards an outboard water ditch above a door opening;
first trough formations extending laterally on either side of the first raised formation, each having a first base surface recessed below the global runoff curvature;
second raised formations extending laterally outboard from each first trough formation, having a second riser surface substantially aligned with the global runoff curvature;
second trough formations extending laterally outboard from each second raised formation, each having a second base surface recessed below the global runoff curvature;
third raised formations extending laterally outboard from each second trough formation, having a third riser surface that is offset above the global runoff curvature;
third trough formations extending laterally outboard from each third raised formation, each having a third base surface that is substantially aligned with the global runoff curvature; and
fourth raised formations extending laterally outboard from each third trough formation, having a fourth riser surface that is offset above the global runoff curvature.

8. The vehicle roof panel of claim 7 wherein the riser surface of the third raised formations is upwardly offset about 14 mm from the second base surface of the second trough formations.

9. The vehicle roof panel of claim 7 wherein a peak height from ground of at least one of the third raised formations and the fourth raised formations is approximately equal to a maximum vehicle height.

10. The vehicle roof panel of claim 7 wherein third trough formations include walls extending upwardly from lateral edges of the third base surface, and an outboard wall is inwardly spaced no more than 100 mm from an outboard lateral edge of the roof panel.

11. The vehicle roof panel of claim 7 wherein a sum of a vertical height of each of a third raised formation and a fourth raised formation is at least 10 mm.

12. A vehicle roof structure comprising:
body side structures, each extending longitudinally along an opposing side of the vehicle; and
an arched roof panel attached to each of the body side structures defining a convex global runoff curvature spanning across the vehicle having an apex center region, wherein the roof panel defines raised formations adjacent the body side structures that are offset above the global runoff curvature, and a plurality of primary troughs is formed near the center region having base surfaces that are offset below the global runoff curvature.

13. The vehicle roof structure of claim 12 wherein the raised formation is offset at least 5 mm above than the global runoff curvature.

14. The vehicle roof structure of claim 12 wherein the roof panel defines two raised formations on each of laterally opposing sides of the vehicle, and wherein a sum of a vertical height of two raised formations is at least 10 mm.

15. The vehicle roof structure of claim 12 wherein a riser surface of the raised formations is offset at least 14 mm above a base surface of at least one primary trough.

16. The vehicle roof structure of claim 12 wherein the raised formations extend longitudinally along the roof structure, and two adjacent raised formations define a secondary trough in a space therebetween.

17. The vehicle roof structure of claim 15 wherein a base surface of the secondary trough is aligned with the global runoff curvature.

18. The vehicle roof structure of claim 15 wherein an outboard wall of the secondary trough is inwardly spaced no more than 100 mm from a corresponding body side structure.

* * * * *